United States Patent [19]
DeLuca et al.

[11] Patent Number: 5,689,981
[45] Date of Patent: Nov. 25, 1997

[54] ANTI-THEFT VEHICLE WHEEL LOCK

[75] Inventors: Nicholas Paolo DeLuca, Jamaica Plain, Mass.; Alvin L. Ramsey, Berkeley; Edward M. Lee, Mtn. View, both of Calif.; Patricia Ann Foote, Allston, Mass.; Shin John Choi, Houston, Tex.; Arlene A. Guerra, Sterling Heights, Mich.

[73] Assignee: Massachusetts Institute of Technology, Cambridge, Mass.

[21] Appl. No.: 361,792

[22] Filed: Dec. 21, 1994

[51] Int. Cl.$^6$ .................. B60R 25/00; B62H 5/14
[52] U.S. Cl. .................. 70/226; 70/259; 70/237; 70/441; 70/395; 188/32
[58] Field of Search .................. 70/14, 18, 19, 70/226, 227, 234–236, 259, 260, 395, 432, 441, 225, 209, 211, 212, 237, 238; 188/32, 36

[56] References Cited

U.S. PATENT DOCUMENTS

| | | | |
|---|---|---|---|
| 3,475,934 | 11/1969 | Reisner | 70/395 |
| 3,695,071 | 10/1972 | West | 70/225 |
| 3,788,108 | 1/1974 | Norcross | 70/196 |
| 3,907,072 | 9/1975 | Schafer | 188/32 |
| 4,073,165 | 2/1978 | Grundstrom | 70/371 |
| 4,164,131 | 8/1979 | Desmond | 70/14 |
| 4,291,296 | 9/1981 | Seifers | 340/64 |
| 4,399,893 | 8/1983 | Switzer | 188/32 |
| 4,582,176 | 4/1986 | Roberts | 188/32 |
| 4,649,724 | 3/1987 | Raine | 70/226 |
| 4,723,426 | 2/1988 | Beaudoin | 70/14 |
| 4,768,359 | 9/1988 | Wade | 70/14 |
| 4,804,070 | 2/1989 | Bohler | 188/32 |
| 4,819,462 | 4/1989 | Apsell | 70/14 |
| 4,833,442 | 5/1989 | Von Heck | 340/427 |
| 4,854,144 | 8/1989 | Davis | 70/226 |
| 4,878,366 | 11/1989 | Cox | 70/14 |
| 4,888,969 | 12/1989 | Suroff | 70/226 |
| 4,913,265 | 4/1990 | Richards | 188/32 |
| 5,040,389 | 8/1991 | Beaudoin | 70/226 |
| 5,045,837 | 9/1991 | Gosker | 340/450 |
| 5,090,223 | 2/1992 | Ruffler | 70/175 |

(List continued on next page.)

FOREIGN PATENT DOCUMENTS

| | | | |
|---|---|---|---|
| 227102 | 4/1963 | Austria | 70/259 |
| 2112725 | 7/1983 | United Kingdom | 70/226 |
| 2147556 | 5/1985 | United Kingdom | 70/260 |

OTHER PUBLICATIONS

Palma Auto–Boot Brochure (date: before Dec. 1, 1993).
Copy of Beyer International Assoc. Inc.brochure Police Enforcement™ Wheel Lock; 2 pages; undated.

*Primary Examiner*—Darnell M. Boucher
*Attorney, Agent, or Firm*—Steven J. Weissburg

[57] ABSTRACT

The apparatus immobilizes a wheel of a vehicle. A chock is connected to a facing bar. Also connected to the facing bar, spaced away from the chock is an engaging bar. The engaging bar has a first, generally elongated straight section and a second section that is shorter than the first straight section, and that is joined to one end of the first section such that the angle between the first section and a portion of the second section is between –45° and +45°, preferably 0°. The engaging bar is attached to the facing bar, such that the first straight section is generally perpendicular to the facing bar, the engaging bar is movable along its first section relative to the facing bar and the second section is rotatable around an axis coaxial with the first section. A lock locks the engaging bar at a desired position relative to the facing bar. The apparatus is arranged such that a user can engage it with a vehicle from a generally standing position, without the need to kneel or reach into the wheel well.

The lock may comprise a locking element, locked by a key in a cooperating key receptacle and a detachable key blocker, which attaches to the key before it is removed from the receptacle. Typically, the key is a starter key for the vehicle to be immobilized, the key blocker attaching to the key such as to prevent use of the key to start the vehicle.

19 Claims, 7 Drawing Sheets

U.S. PATENT DOCUMENTS

| | | | |
|---|---|---|---|
| 5,103,660 | 4/1992 | Johnson | 70/209 |
| 5,109,685 | 5/1992 | Westwinkel | 70/368 |
| 5,134,868 | 8/1992 | Bethards | 70/18 |
| 5,137,121 | 8/1992 | Leonard | 70/18 |
| 5,265,451 | 11/1993 | Phifer | 70/226 |
| 5,315,848 | 5/1994 | Beyer | 70/18 |
| 5,410,897 | 5/1995 | Edmondson | 70/226 |
| 5,437,171 | 8/1995 | Owen | 70/226 |

ANTI-THEFT VEHICLE WHEEL LOCK

BACKGROUND

The present invention relates generally to vehicle anti-theft devices, and more specifically, to anti-theft devices that immobilize a wheel of a vehicle.

Theft of automobiles and other vehicles is a prevalent problem. Many devices have been developed to thwart would-be thieves. All have drawbacks, or can be defeated. Electronic alarms and ignition-defeat systems can usually be overcome by speedy access to the electronic elements. Furthermore, even if they do work, by the time the thief has been stymied, the vehicle has been damaged by the thief's attempt to gain entry to the vehicle. Steering wheel locks can be removed by cutting through the generally softer steering wheel.

A typical wheel lock, such as is used by municipalities to immobilize vehicles subject to high amounts of parking fines, is generally effective against removal, but is also generally heavy and difficult to engage and disengage. The user must kneel on the ground and at the same time reposition the heavy metal device. Thus, the user must be relatively strong and dexterous, and stands a good chance of soiling his/her clothes. Some of these wheel locks also require that the user reach behind the wheel, or inside the vehicle wheel well, to engage and/or disengage the lock.

Other wheel locks include a tire piercing feature, which renders the vehicle temporarily unusable by the thief, but also by the owner.

Thus, the several objects of the invention include to protect a vehicle against theft with a device that is dependable, easy to install and disengage. The anti-theft device should be lightweight and engagable from a near standing position, without requiring access to the dirty areas behind the wheel and within the wheel well. Another object is to alert the would-be thief that the vehicle is protected by an effective device, so that the thief passes the vehicle by to another vehicle. It is a further objective to alert the owner of the vehicle that the device is engaged to the vehicle, and to prevent moving the vehicle without disengaging the anti-theft device. It is also an object that the anti-theft device be compact and easily stowable in a vehicle trunk.

BRIEF DESCRIPTION OF THE DRAWINGS

These and other features, aspects, and advantages of the present invention will become better understood with regard to the following description, appended claims and accompanying drawings, where:

SUMMARY

A preferred embodiment of the invention is an apparatus for immobilizing a wheel of a vehicle. The apparatus comprises a chock, a facing bar that is connected to the chock at one end and an engaging bar, connected to the facing bar, spaced away from the chock approximately one diameter of a tire to be immobilized. The engaging bar comprises a first, generally elongated straight section and a second section that is shorter than the first straight section, and that is joined to one end of the first section such that the angle between the first section and a portion of the second section is between −45° and +45°. The apparatus also includes means for attaching the engaging bar to the facing bar, such that the first straight section is generally perpendicular to the facing bar, the engaging bar is movable along its first section relative to the facing bar and the second section is rotatable around an axis coaxial with the first section. The apparatus also comprises a lock that locks the engaging bar at a desired position relative to the facing bar.

The apparatus is arranged such that a user can engage it with a vehicle, from a generally standing position, without the need to kneel or reach into the wheel well.

Typically, the sections of the engaging bar are joined to each other such that the distance between the first and second sections is equal to or greater than the annular radius of a vehicle tire to be immobilized by the apparatus. The first and second sections are typically parallel to each other, and may be in the form of a square or smooth hook.

In another preferred embodiment of the apparatus the engaging bar is movable relative to the facing bar a distance equal to or greater than the width of a vehicle tire to be immobilized by the apparatus, such that the engaging bar can be moved behind the tire and can be moved back away from the facing bar, thereby trapping the tire therebetween.

The engaging bar may be provided with a retractable handle, and the facing bar may be hinged or telescoping to facilitate compact storage.

According to another preferred embodiment of the invention, the lock that locks the engaging bar to the facing bar comprises a locking element, which is locked by a key in a cooperating key receptacle and a detachable key blocker, which attaches to the key before the key is removed from the cooperating key receptacle. Typically, the key is a starter key for the vehicle to be immobilized, the key blocker attaching to the key such as to prevent use of the key to start the vehicle.

Another preferred embodiment of the invention is a security device for a wheeled vehicle that is started with a starter key. The security device comprises an element that engages a wheel of the vehicle, such that motion of the wheel is impeded and a lock that secures the engaging element to the wheel. The lock comprises a locking element, which is locked by the starter key in a cooperating key receptacle; and a detachable key blocker, which attaches to the starter key before the key is removed from the cooperating key receptacle.

According to another preferred embodiment, the invention is a security device for a primary apparatus that experiences a primary change of state initiated with a mechanical key, which primary change of state is desired to occur only after a change of state of a secondary apparatus. The security device comprises a preventing element that prevents the change of state of the secondary apparatus; and a lock that secures the preventing element in a preventing configuration. The lock comprises a locking element, which is locked by the mechanical key in a cooperating key receptacle and a detachable key blocker, which attaches to the mechanical key before the key is removed from the cooperating key receptacle. When the key blocker is attached to the key, the key can not be used to initiate the primary change of state of the primary apparatus.

DETAILED DESCRIPTION

Figure 1:
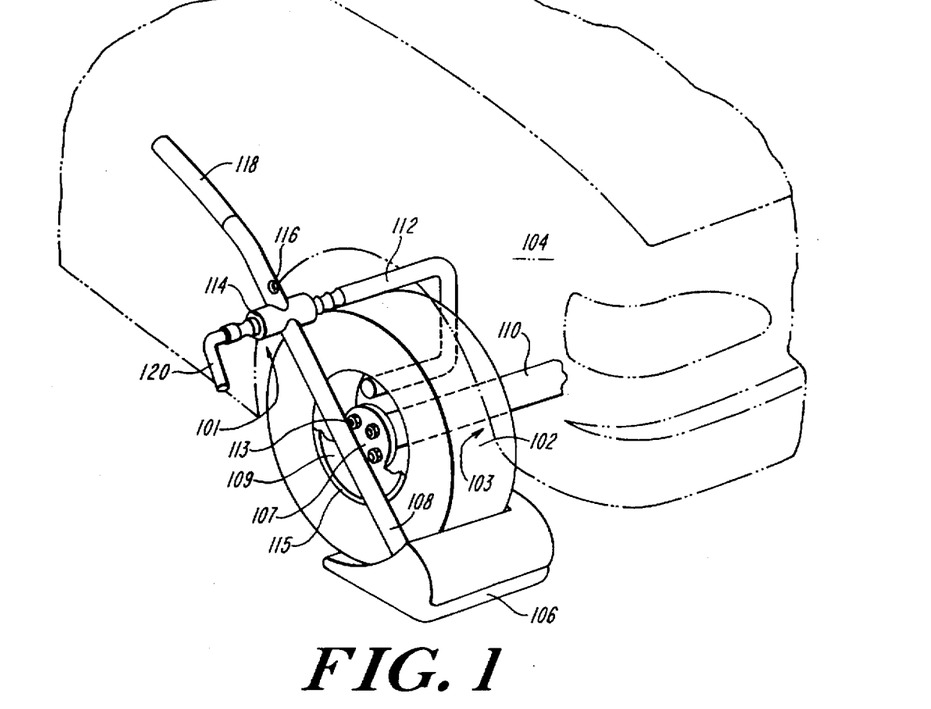
FIG. 1 is a schematic perspective view of an embodiment of the anti-theft device of the invention engaged to the front wheel of a vehicle to be immobilized.

An embodiment of the vehicle lock of the invention is shown schematically in FIG. 1, engaging the front tire 102 of a wheeled vehicle 104. The vehicle has an axle 110, which is connected to the tire 102 through a hub 107 and wheel 109 shown partially broken away, so that the means by which the lock engages the tire can be illustrated. The wheel 109 has a rim 115. The hub is of a normal type, upon which the tire is mounted in the normal fashion with a wheel, for instance, with one central or several peripheral nuts 113 and lugs.

The vehicle lock includes a chock 106, which is wedged in front of the tire 102. A facing bar 108 is securely attached to the chock 106, and extends from the chock, substantially along a diameter of the tire 102. The facing bar 108 is pressed tightly adjacent the face of the tire. The facing bar 108 is connected to an engaging bar 112. In the embodiment shown, the engaging bar 112 passes through an appropriately sized opening 114. A lock 116 secures the engaging bar 112 to the facing bar 114, an a desired position and orientation. The facing bar 112 terminates with a handle portion 118, which is adapted to ease handling and gripping the entire device. The engaging bar 112 also includes a handle portion 120 at the end distal from the end that engages the tire.

Figure 2:
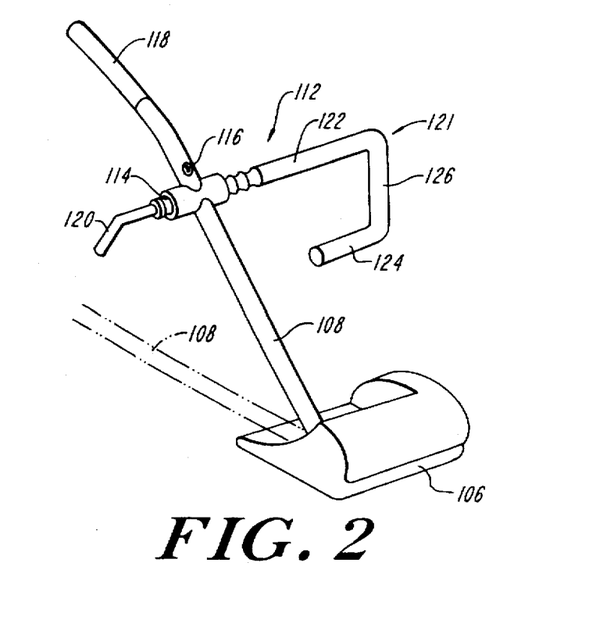
FIG. 2 is a schematic perspective view of an embodiment of the anti-theft device of the invention in an engaged configuration, with the vehicle hub and wheel rim (partially broken away), showing also, in phantom, a collapsed position of the facing bar of the apparatus.

The elements of the lock are shown more clearly in FIG. 2, which omits the vehicle and the wheel and the tire. (The embodiment shown in FIG. 2 is slightly different from that shown in FIG. 1, with a different placement of the locking element 116, and different configurations of the handles 118 and 120. However, it is functionally the same as that shown in FIG. 1.) The engaging bar 112 has an engaging end 121, which engages the tire 102 and the wheel 109. The engaging end includes a substantially straight portion 122, which is slidably clamped relative to the facing bar 108, and a second section 124 that is connected to the first section 122 by a joining section 126.

The facing bar 108 may be connected to the chock 106 in a permanent angular orientation, or it may be hinged, so that it can move to a more compact configuration, such as shown in phantom.

Figure 3A:
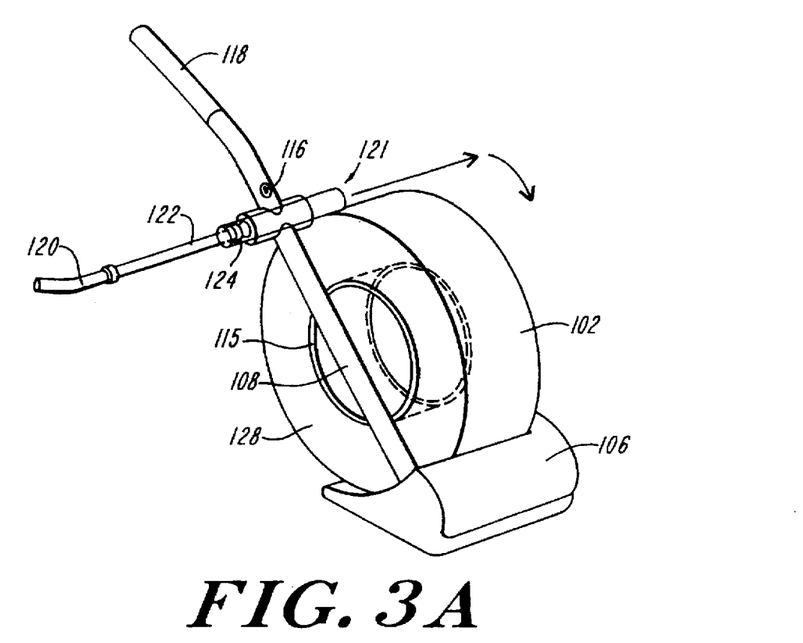
FIG. 3A is a schematic perspective view of an embodiment of the anti-theft device of the invention, having an engaging bar in the form of a square hook, with the engaging bar in a fully disengaged configuration relative to the wheel of a vehicle to be immobilized, showing the wheel rim, without the wheel body.
Figure 3B:
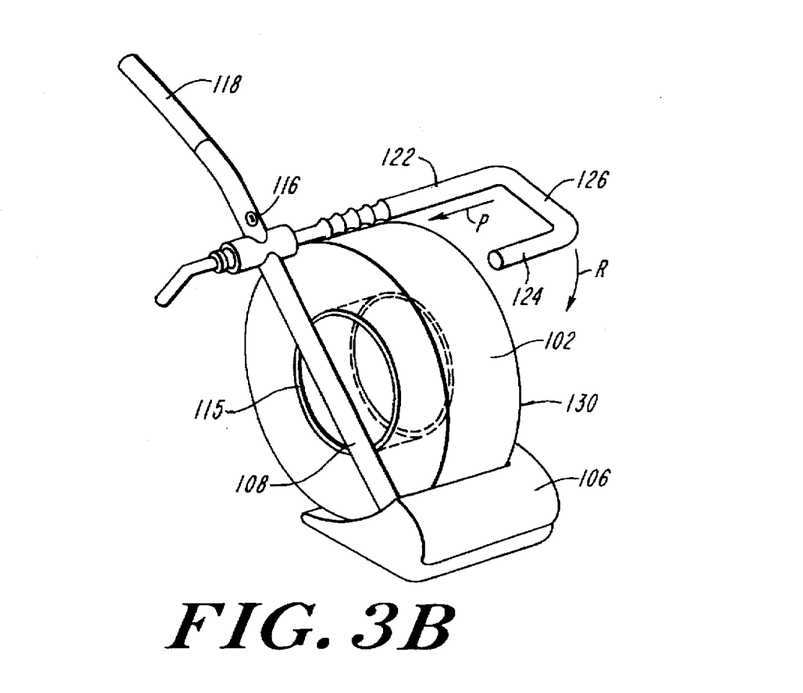
FIG. 3B is a schematic perspective view as shown in FIG. 3A, with the engaging bar in an intermediate configuration relative to the wheel of a vehicle to be immobilized, with the engaging bar about to be moved into the locking configuration.
Figure 3C:
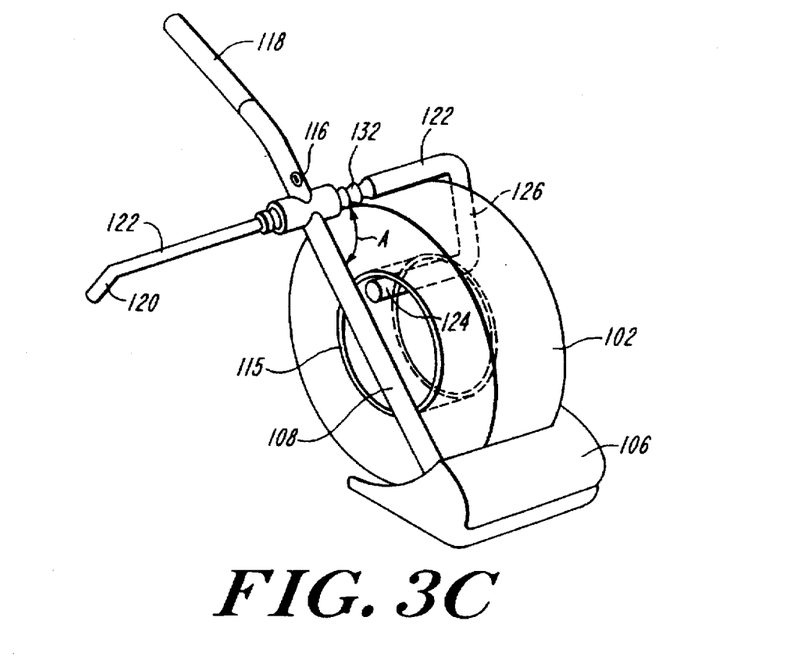
FIG. 3C is a schematic perspective view as shown in FIG. 3A, with the engaging bar in the locking configuration relative to the wheel of a vehicle to be immobilized.

The means by which the apparatus engages a tire and wheel is shown with reference to FIGS. 3A, 3B and 3C, (in which the vehicle and the axle are not shown for clarity). The completely disengaged position is shown in FIG. 3A. The engaging bar 112 is withdrawn fully away from the tire 102, such that the second portion 124 is essentially on the same side of the plane defined by the tire face adjacent the facing bar 108. It is also rotated around the axis of the first portion 122, to a position that will clear the tire if the first portion 122 were moved along its axis toward the vehicle. The facing bar is touching, or nearly touching the face 128 of the tire 102.

The next position is shown in FIG. 3B, which is achieved by the user grasping the handle 120 of the engaging bar 122, and pushing it toward the vehicle. As shown in FIG. 3B, now the second section 124 is beyond the hidden face 130 of the tire.

The next position is shown in FIG. 3C, which is achieved by the user twisting the handle 120 such that the second section 124 rotates as indicated by the arrow R, around the axis of the first portion 122, and pulling the handle so that the first section 122 (and the entire engaging bar) move away from the vehicle, in the direction of the arrow P. As shown in FIG. 3C, the tire 102 and the wheel rim 115 are now captured by the engaging bar 112 and the facing bar 108. The second section 124 of the engaging bar is between the inner circumference of the tire and the tire's center of rotation, and is also well inside the tire. By "inside" the tire, it is meant between the hidden face 130 and the outward face 128. (The second section 124 is also between the outer circumference of the wheel rim 115, and the center of rotation of the tire.) Typically, the joining section 126 of the engaging bar is pulled tightly against the hidden face 130 of the tire, although this is not necessary.

In this configuration, the lock 116 is engaged. The lock is arranged to secure the engaging bar in its position relative to the facing bar 108, as well as its rotational position relative to the axis of the straight section 122. The engaging bar may be secured by conventional sliding bar constraints, such as the scalloped surfaces 132 and a cooperating, movable surface inside the opening 114, secured by engagement of the lock 116.

Thus, with the engaging bar secured, the tire and the wheel are trapped between the facing bar and the engaging bar and the chock. If one were to start the vehicle, the chock impedes the forward movement of the tire. If the tire somehow does roll over the chock, it will be prevented from further rolling when the handle 118 contacts the ground.

The chock further hits the rear interior wheel well area 101 of vehicle 104 (FIG. 1). If one were to attempt to move the vehicle in reverse, the chock 106 will jam in the forward wheel well area 103 of the vehicle 104. Deflation of the tire will not alter the effectiveness of the deterrent, as the locking occurs not only on the tire surface but also between the internal and external metal surfaces of the wheel rim 115.

Thus, to use the device, the user need not kneel on the ground or reach behind the wheel into the dirty recesses. The apparatus can be engaged while standing, by manipulating the handles of the apparatus to position the facing bar and the engaging bars in the locking configuration.

Figure 3D:
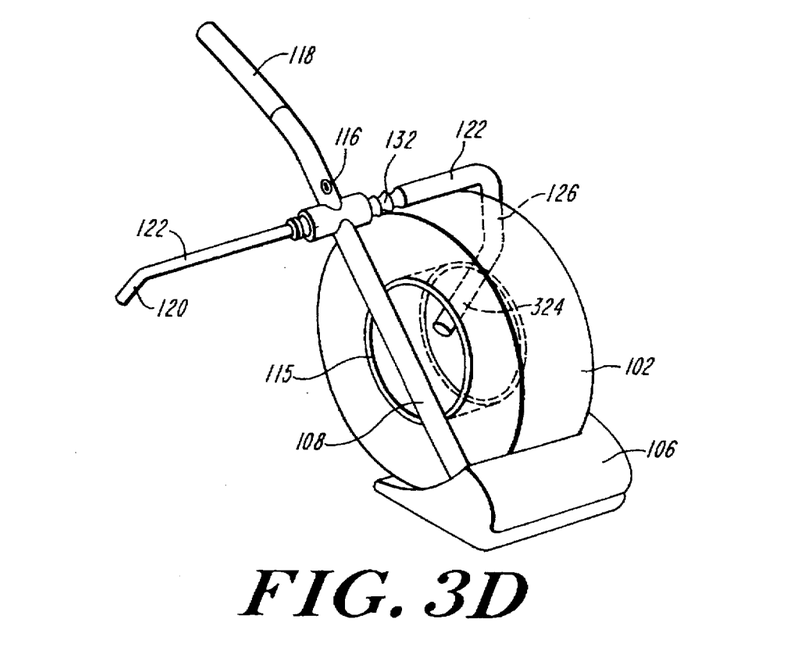
FIG. 3D is an embodiment of the invention as shown in FIG. 3C, except that the angle between the first and second portions of the engaging bar is at about +40°.
Figure 3E:
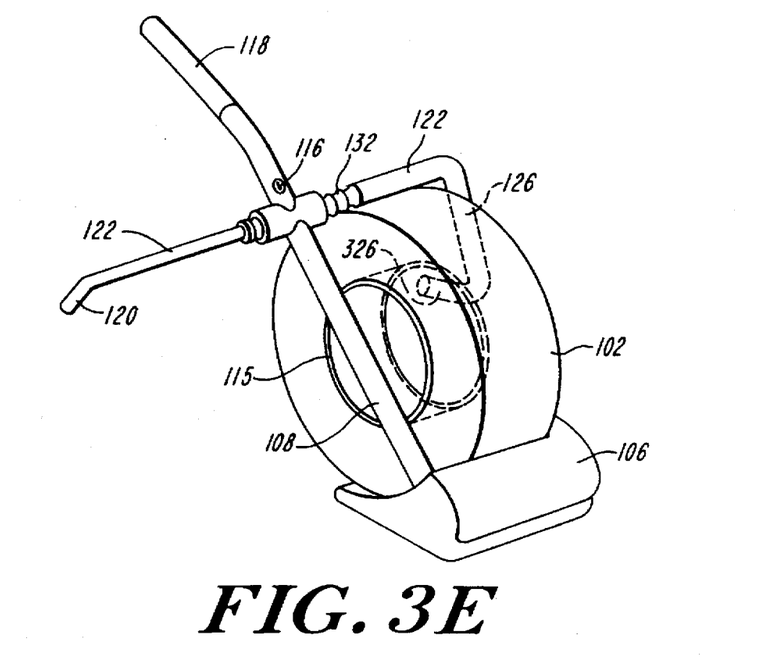
FIG. 3E is an embodiment of the invention as shown in FIG. 3C, except that the angle between the first and second portions of the engaging bar is at about −40°.

As described above, the second portion 124 of the engaging bar is attached to the first portion 122 such that they are generally parallel. This is a preferred embodiment. Other embodiments can be employed where, rather than parallel, the two portions are angled to each other, at any angle between +45° and −45° (with parallel being at 0°). For instance, as shown in FIG. 3D, the second portion 324 is inclined at an angle of approximately −40°, relative to the first portion 122. FIG. 3E shows an embodiment an an angle of approximately +40° relative to the first portion 122.

Figure 3F:
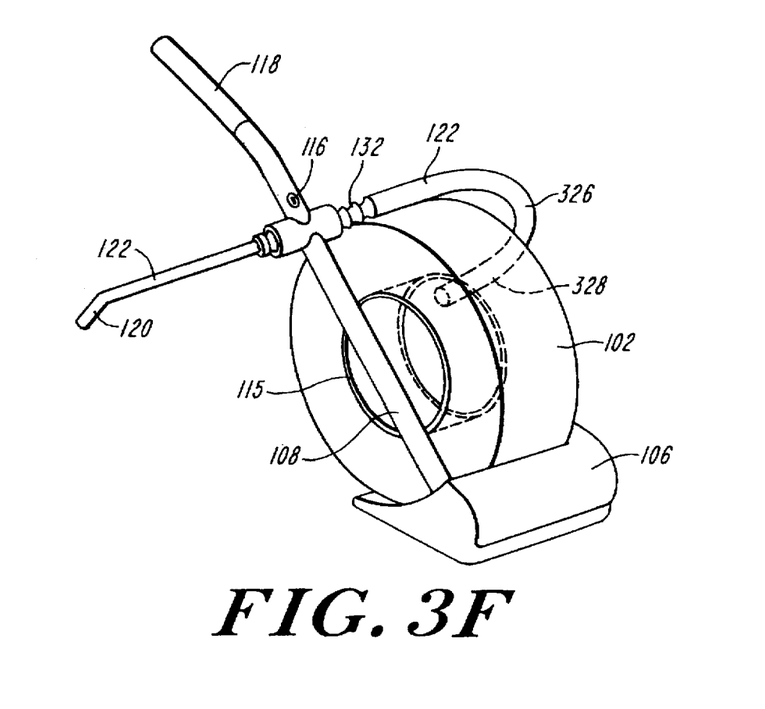
FIG. 3F is a schematic perspective view of an embodiment of the anti-theft device of the invention, with a portion of the engaging bar formed in the shape of a smooth hook.

As shown in FIGS. 3A–E, the first section 122 and the second section 124 (in FIGS. 3A–3B) form a generally "square" hook (having square angular connections between each of the first and second sections and the connecting section 126). It is also possible, as shown in FIG. 3F, for the first section 122, to be connected to the second section 328 through a connecting section 326, to form a smooth hook.

Similarly, as described above, the angle "A" (FIG. 3C) between the facing bar 108 and the engaging bar is typically approximately 90°. However, it may range from approximately 45° to 135°.

It may also be advantageous to provide a shield attached to the facing bar 108 to prevent a thief from removing the lug units that secure the wheel rim 109 to the hub 107.

Figure 4:
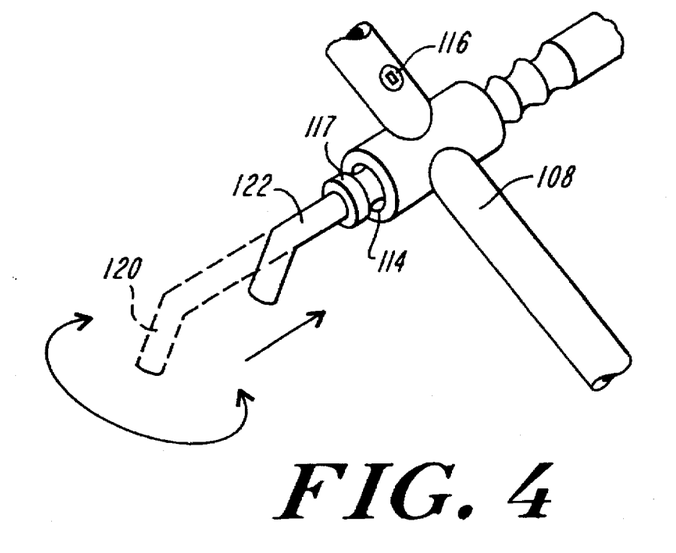
FIG. 4 is a schematic perspective view showing the telescoping handle portion of the engaging bar, in both an extended position (phantom) and a collapsed position.

As shown in FIG. 3A, the handle 120, in the engaged position, could extend undesirably far from the vehicle, thereby impeding pedestrian traffic and user safety. To minimize this inconvenience, as shown in FIG. 4, the handle can be mounted to the straight portion 122 such that it can telescope into the body of the engaging bar, where it can be secured with conventional telescoping hardware.

Figure 5:
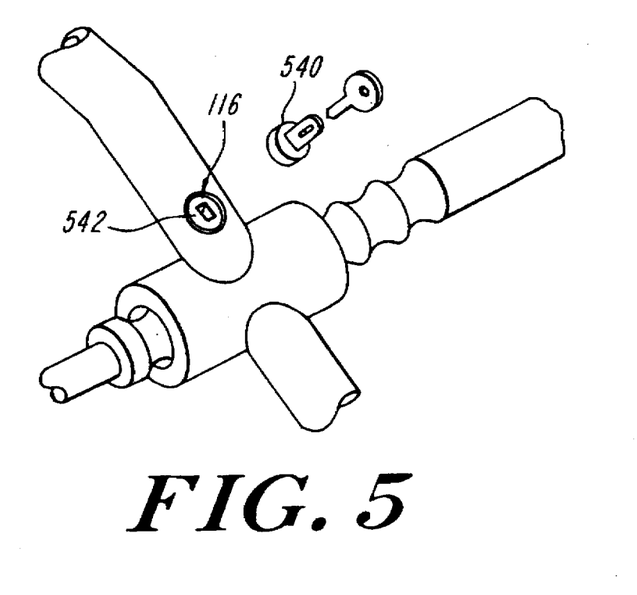
FIG. 5 shows schematically the lock portion of an embodiment of the invention, showing the key receptacle, the key blocker portion of the lock key and a vehicle key.
Figure 6:
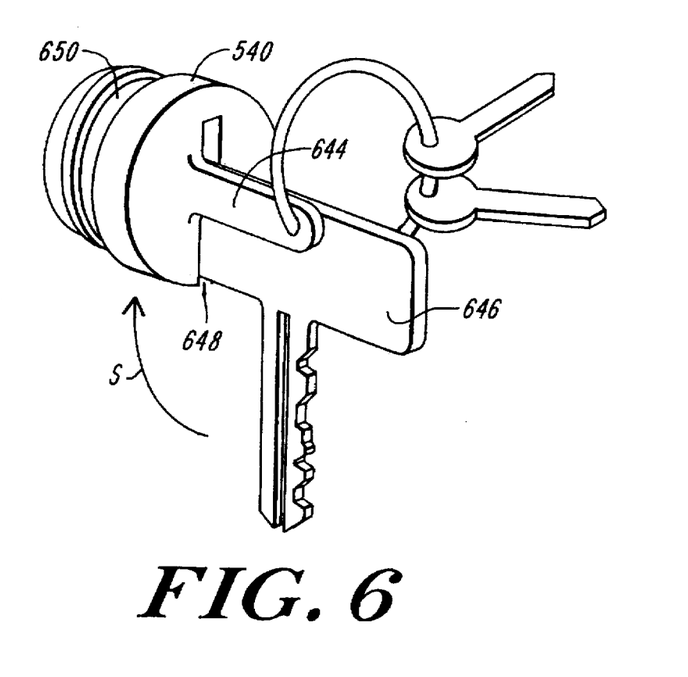
FIG. 6 shows schematically, in perspective view, a vehicle key and a key blocker portion of the lock key of an embodiment of the invention.

A novel aspect of the immobilizing device of the invention prevents accidental damage to the vehicle from an authorized use while the immobilizing device is still attached. A safety interlock feature of the lock prevents this. As shown in FIG. 5, the key to open the lock is made up of two separate parts. A key blocking element 540 cooperates with a lock cylinder actuating element 542, shown in more detail in FIGS. 7 and 8. As shown in FIG. 6, the key blocking element 540 has a shank 644 for engagement with a conventional key ring, upon which is secured a conventional vehicle key 646. The body 650 of the key blocking element is generally barrel shaped, with a slot 648, that extends along its full length, adjacent the shank 644.

Figure 7:
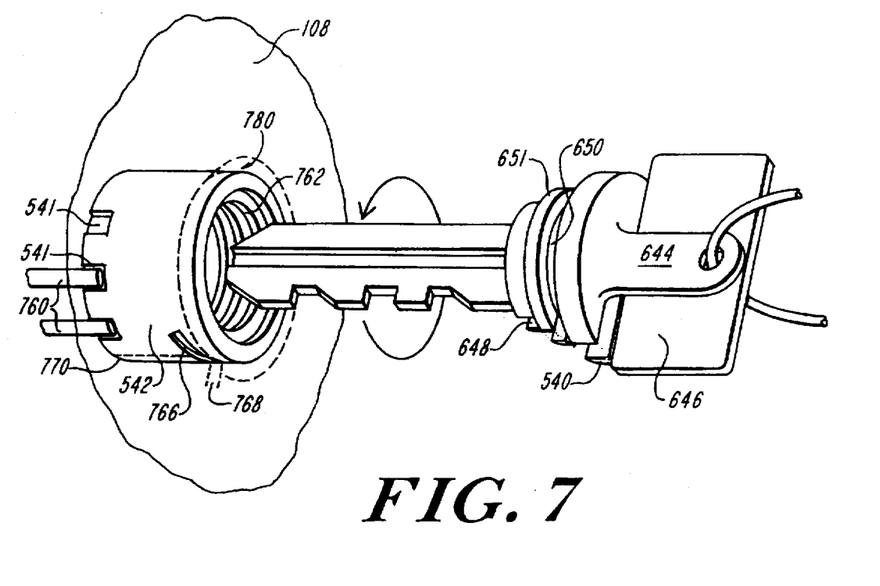
FIG. 7 shows schematically, in perspective view, a vehicle starter key, engaged by a key blocker portion of the lock key, adjacent the lock activating portion of the lock key of an embodiment of the invention.

To use the key for the anti-theft lock, the vehicle key 646 must be swung within the barrel body 650, in the direction of the arrow S. The key 646 and the key blocking element 540 thus form a unit as shown in FIG. 7. The lock cylinder actuating element 542 is preferably of the barrel type used with "ace-key" or tubular key type locks. The actuating element has a notch 766 to serve as a locking lever or cam surface within the handle shaft 108, mating with a tooth 768, protruding from the inside of the cavity 780 in which the lock is set.

As shown in FIG. 7, the key actuating element 542 is in place, within the key portion of the facing bar 108, shown mostly broken away. The key actuating element 542 is shown engaging the spring pins 760 of the lock mating with the key actuating element at the depressions 541 around its perimeter. When the lock is not in use, the actuating element is secured in the handle 118 in this position by interlocking of the tooth 768 with the groove 766. To lock the anti-theft device, the combined vehicle key and key blocking element unit is mated with the key actuating element 542, by engaging the mating screw threads 651 on the key blocking element 650 with the threads 762 inside the key actuating element. Thus mated, the handle of the vehicle key 646 thus serves as the handle for the key actuating element, which can be rotated, locking the lock 116, and removed. The groove 766 is connected to a channel 770, that permits the actuating element to be disengaged from the tooth 768.

Figure 8:
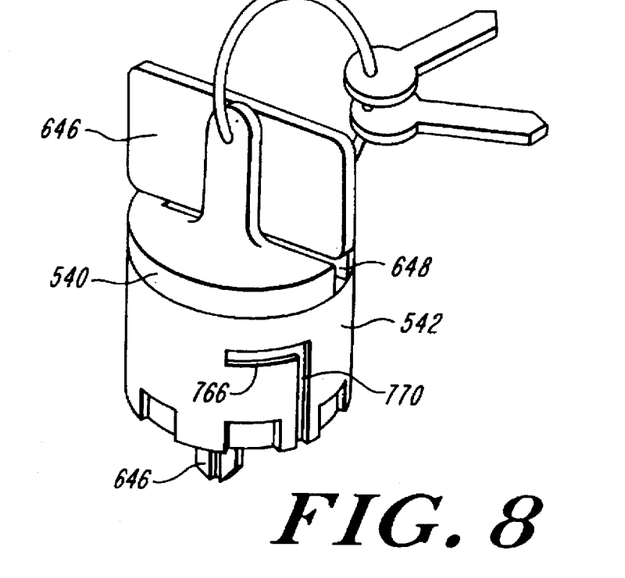
FIG. 8 shows schematically, in perspective view, the vehicle starter key, engaged with the key blocker portion of the lock key, which is itself engaged with the lock activating portion of the key.

The fully associated key actuating element 542, key blocking element 540 and vehicle key 646 are shown in FIG. 8. The key actuating element is threaded and thus securely attached to the key blocking element 540. The vehicle key 646 is trapped in the slot 648 by the encircling barrel of the key actuating element 542. The vehicle key can not be accidentally used to start the vehicle, because it is obscured by the key blocking element 540 and the key actuating element 542.

To disengage the anti-theft device, the assembled key complex shown in FIG. 8 is inserted into the lock 116 and rotated. The key actuating element 542 unlocks the engaging bar 112 from the facing bar 108. Further rotation of the key complex is impeded by the tooth 768, but the key blocking element 540 can continue to rotate relative to the key actuating element 542, by virtue of the threaded engagement. Such rotation frees the key blocking element from the lock actuating element, thereby allowing the vehicle key 646 to be swung to freedom and a usable position.

As mentioned, one object of the invention is to provide an anti-theft device that is relatively compact and provides for accomodating different tire diameters. Typically, each tire diameter requires a lock having a facing bar that most appropriately fits it. The device can be used with any wheeled vehicle, including cars, trucks, trailers and large motorcycles.

Figure 9A:
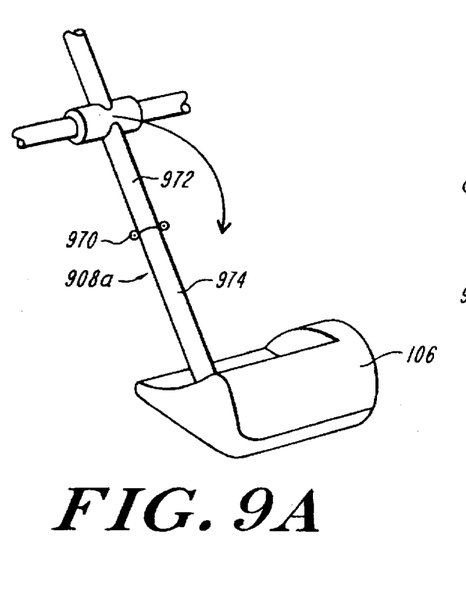
FIG. 9 shows schematically an embodiment of the invention having a foldable facing bar.
Figure 9B:
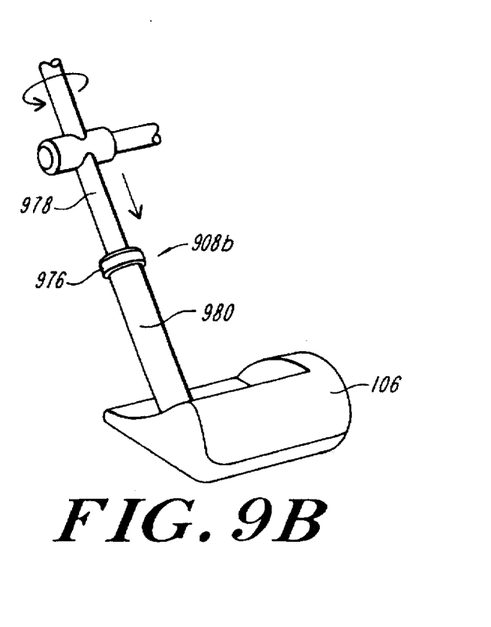

In some instances, it may be advantageous to enable the facing bar to be reduced in effective length. Two embodiments of the invention that accomplish this are shown in FIGS. 9A and 9B. As shown in FIG. 9A, a hinge 970 joins two components 972 and 974 of the facing bar 908a. Thus, the effective length of the facing bar 908a can be reduced by folding the hinge. The hinge must be of a type that does not reduce the anti-theft integrity of the device. Thus, it should not be possible to easily collapse the hinge, or disassemble it when the lock is applied to the vehicle.

Another embodiment to accomplish a similar effect is shown in FIG. 9B. A telescope lock ring 976 locks two components 978 and 980 to each other in an extended length configuration. To stow the assembly, the telescope lock 976 is loosened and the smaller diameter element 978 is slid inside of the larger diameter element 980, thereby effectively reducing the overall length of the facing bar 908b.

The major elements of the device must be made of a suitably light and destruction resistant material, such as aluminum or steel alloys, or possibly carbon fiber composite. It is also beneficial to paint the entire device in a bright color that will not escape the notice of the would-be thief. Knowing that the device is highly theft resistant, the thief will have an incentive to avoid the vehicle and pass to one that is not so obviously protected.

The novel locking element shown, using the key blocker, may be used in other devices, rather than a vehicle immobilizing device. It is useful for any situation where a change of state of a secondary apparatus must take place before a primary change of state takes place in a different, primary apparatus or a primary aspect of an apparatus as a whole. For instance, the key could be used to secure a child restraint in a vehicle before the vehicle is stored. or, the key/lock system could be used to engage a home security alarm circuit before the home door is locked with a key. The primary and secondary apparati may be two totally separate apparati, or may be separate components of the same apparatus, such as a safety shield and a starter used for a machine tool.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. An apparatus for immobilizing an annular tire of a vehicle, said tire having an outer radius and diameter, an inner radius and an annular radius, an outer face and an inner face, and a width therebetween, said apparatus comprising:
   a. a chock, having a tire circumference engaging surface and a around engaging surface;
   b. an elongated facing bar, having first and second ends, which facing bar is connected to said chock at said first end, such that said facing bar is located in a tire facing plane that is perpendicular to both said around engaging surface and said tire circumference engaging surface and which tire facing plane, in use, is parallel to and adjacent the outer face of a tire to be immobilized;
   c. an engaging bar, that is connected to said facing bar, spaced away from said chock approximately one outer diameter of a tire to be immobilized, said engaging bar comprising:
      i.) a first, generally elongated straight section having a first and a second end, that is connected near its first end perpendicularly to said facing bar, and that is also oriented perpendicular to said tire facing plane; and
      ii.) a second section that is shorter than said first straight section, and that is free at a first end and joined at a second end to said end of said first section, such that an angle between said first section and a portion of said second section is between −45° and +45°;
   d. means for adjustably attaching said engaging bar to said facing bar, such that:
      i). said engaging bar is translatable perpendicularly to said tire facing plane, relative to the facing bar; and
      ii). said second section is rotatable around an axis coaxial with said first section; and
   e. a lock that locks said engaging bar at a desired position relative to said facing bar.

2. The immobilizing apparatus of claim 1, wherein said second section is joined to said first section such that the distance between said first section and the free end of said second section is equal to or greater than the annular radius of a vehicle tire to be immobilized by said apparatus.

3. The immobilizing apparatus of claim 1, wherein said engaging bar is translatable relative to said facing bar a distance equal to or greater than the width of a vehicle tire to be immobilized by said apparatus.

4. The immobilizing apparatus of claim 1, said straight section further comprising a handle at said first end.

5. The immobilizing apparatus of claim 1, said facing bar further comprising a handle located at said second end of said facing bar.

6. The immobilizing apparatus of claim 1, said facing bar being hingedly connected to said chock.

7. The immobilizing apparatus of claim 1, said facing bar comprising means for making it more compact.

8. The immobilizing apparatus of claim 7, said means for making said facing bar more compact comprising a pair of telescoping members.

9. The immobilizing apparatus of claim 7, said means for making said facing bar more compact comprising a hinge between the ends of said facing bar.

10. The immobilizing apparatus of claim 1, wherein said second section of said engaging bar is able to rotate through at least 60°.

11. The immobilizing apparatus of claim 1, wherein said facing bar is connected to said chock such that when said ground engaging surface of said chock is on the ground, and said tire engaging surface is wedged against a tire of a vehicle, said facing bar can be oriented substantially parallel to and coplanar with an outer diameter of said tire, both said facing bar and said outer diameter of said tire lying in a plane that is perpendicular to said tire facing plane.

12. The immobilizing apparatus of claim 1, wherein said second section is substantially straight along its length.

13. The immobilizing apparatus of claim 11, wherein said engaging bar is attached to said facing bar such that, with said facing bar adjacent the outer face of a vehicle tire and arranged parallel to and coplanar with a diameter of said tire, said engaging bar is movable according to the following steps:
   a). translated perpendicular to and away from said facing bar, and perpendicular to said tire facing plane, to a position where said second section is beyond the inner face of the tire;
   b). rotated around said axis of said first section; and then
   c). translated toward said facing bar, such that the annulus of said tire is engaged between said first and second sections of said engaging bar.

14. The immobilizing apparatus of claim 1, said lock further comprising:
   a. a locking element, which is locked by a key in a cooperating key receptacle; and
   b. a detachable key blocker, which attaches to said key before said key is removed from said cooperating key receptacle of said locking element in a locked configuration.

15. The immobilizing apparatus of claim 14, said key further comprising a starter key for said vehicle to be immobilized, said key blocker attaching to said starter key such as to prevent use of said starter key to start said vehicle.

16. The immobilizing apparatus of claim 1, where the angle between said first section and a portion of said second section is substantially 0°, such that the first and second sections are parallel.

17. The immobilizing apparatus of claim 1, said means for attaching said engaging bar to said facing bar comprising means for holding the first section of the engaging bar at substantially 90° to said facing bar.

18. The immobilizing apparatus of claim 1, said second section of said engaging bar formed and connected to said first section of said engaging bar in the form of a smooth hook.

19. The immobilizing apparatus of claim 1, said second section of said engaging bar formed and connected to said first section of said engaging bar in the form of a square hook.

* * * * *

UNITED STATES PATENT AND TRADEMARK OFFICE
CERTIFICATE OF CORRECTION

PATENT NO. : 5,689,981
DATED : November 25, 1997
INVENTOR(S) : DeLuca et al.

It is certified that error appears in the above-indentified patent and that said Letters Patent is hereby corrected as shown below:

Column 7, line 23, correction in text from:

"and a around engaging surface;" to

--and a ground engaging surface;

Column 7, line 42, correction in text from:

"joined at a second end to said end of said first section," to

--joined at a second end to said second end of said first section,--

Signed and Sealed this

Tenth Day of March, 1998

Attest:

BRUCE LEHMAN

Attesting Officer     Commissioner of Patents and Trademarks